July 25, 1950 M. VALIN 2,516,813
TRAILER DRAFT DEVICE
Filed May 7, 1947 3 Sheets-Sheet 1
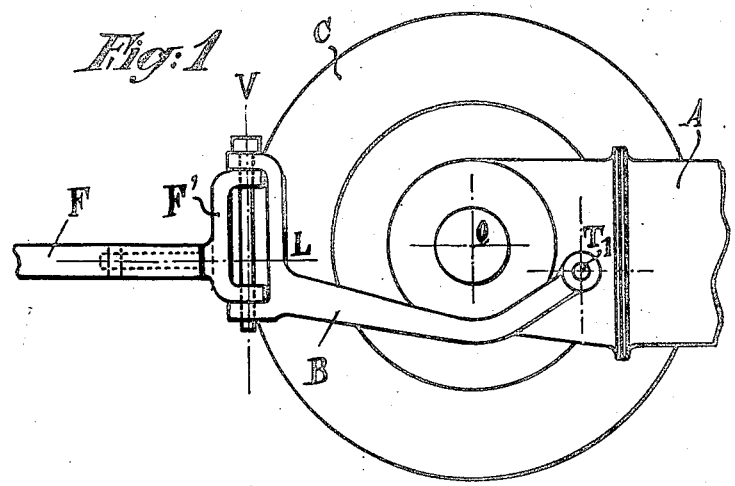
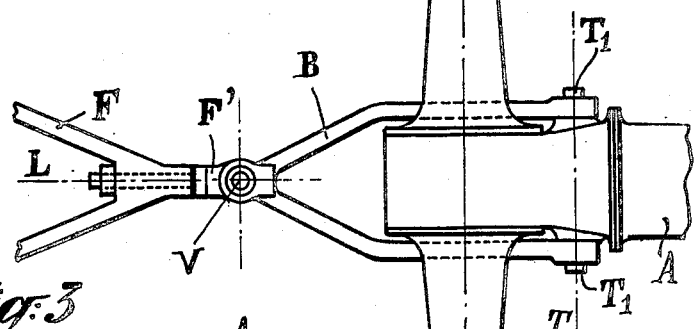
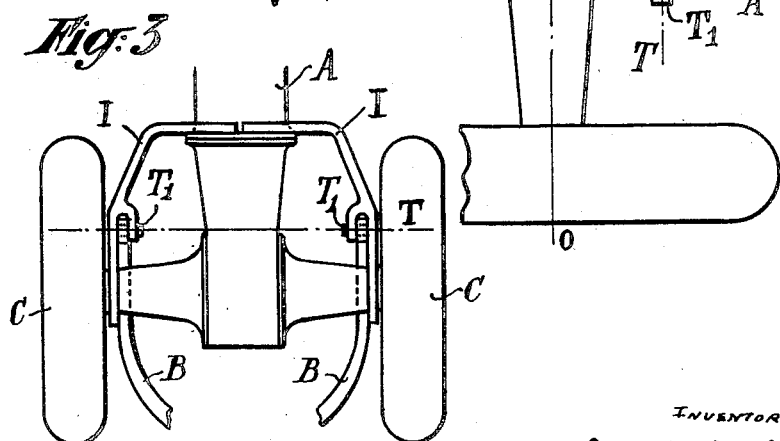
INVENTOR
Maurice Valin
By Watson, Cole, Grindle & Watson
ATTYS

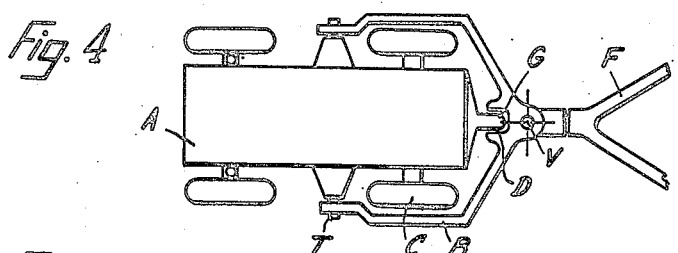
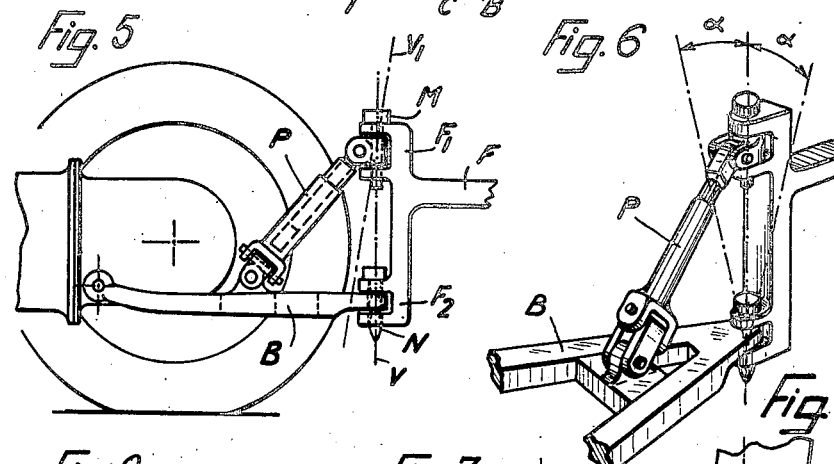
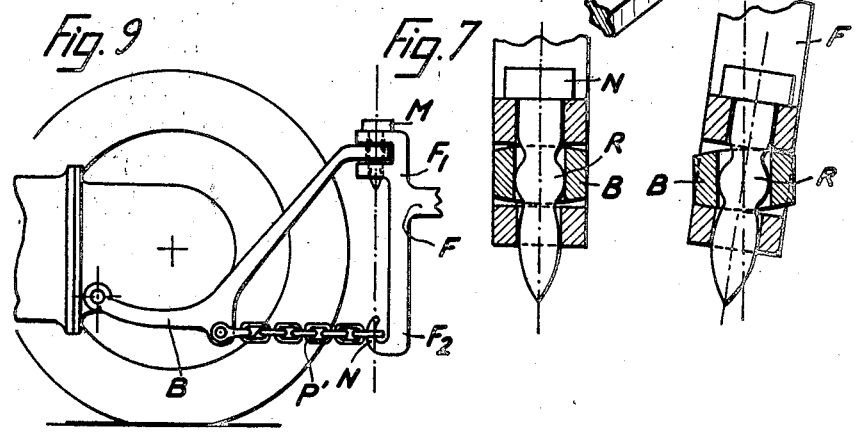
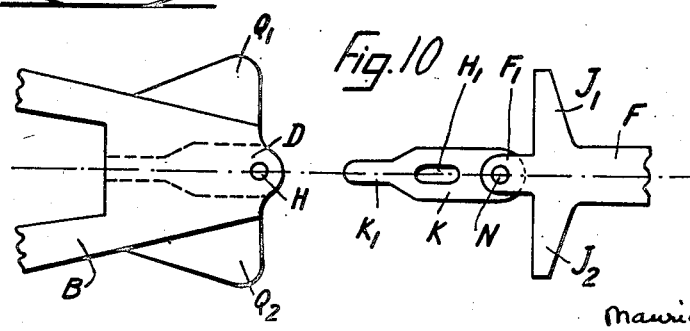

July 25, 1950     M. VALIN     2,516,813
TRAILER DRAFT DEVICE
Filed May 7, 1947     3 Sheets-Sheet 3
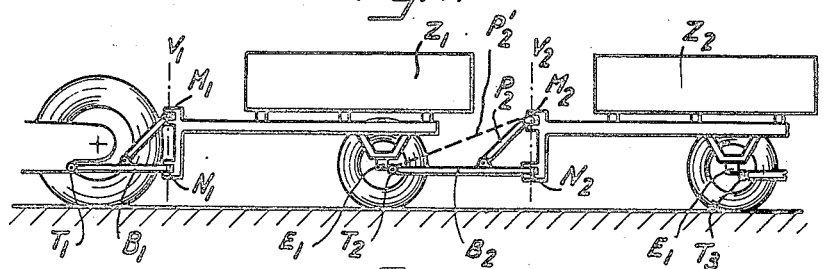
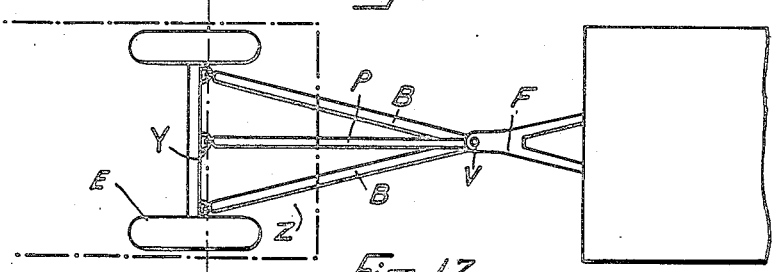
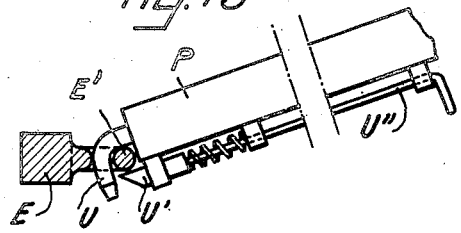
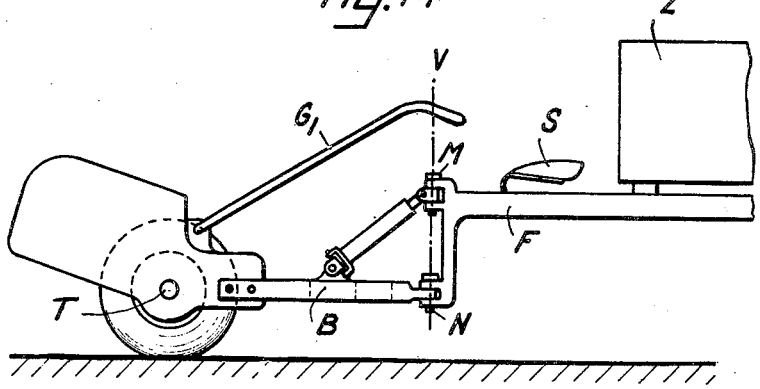
INVENTOR
Maurice Valin
By Watson, Cole, Grindle & Watson
ATTYS

Patented July 25, 1950

2,516,813

UNITED STATES PATENT OFFICE 2,516,813

TRAILER DRAFT DEVICE

Maurice Valin, Chartres, France

Application May 7, 1947, Serial No. 746,498
In France May 14, 1946

5 Claims. (Cl. 280—33.44)

1

Any coupling device for trailers should allow the pivoting of the trailer with reference to the tractor simultaneously round three axes perpendicular to one another, to wit:

A horizontal axis transversal with reference to the tractor for coping with the longitudinal modifications of the ground level, A vertical axis to allow steering, A longitudinal horizontal axis for coping with the transversal changes in the ground level.

In the coupling means generally used with agricultural tractors, the three axes generally meet at a same point and cooperate to form a single part constituting a hook, ring or strap adapted to engage the hook or traction bar of the tractor so as to allow the pivoting of the trailer in all possible directions.

The conditions of operation of the agricultural tractors define the position as to height of the coupling members that can never be located above driving wheels assuming a large diameter. The necessity of turning sharply without the beam or sweep of the trailer abutting against the ground-engaging cramps or the tires of the wheels constrains therefore a transfer of the coupling point clearly to the rear of the axis of the driving wheels.

On the other hand the rational equilibrium of a trailer requires a correct distribution of the vertical load that may be applied to it over the front and rear axles. Its point of application should be located between the two axles in a position such that a predetermined fraction of said load may urge the front wheels towards the ground in antagonism with the driving reaction or with a tendency to rearing or tilting which is proportional to the driving stress.

When a vertical load is borne by the tractor coupling member, the rational conditions of stability locate the coupling point to the front of the axis of the rear wheels in contradistinction with the position generally given to said point. The case of a vertical load applied to the coupling members is a frequent one and it occurs each time the resultant of the resistances to the movements of the tractor is not horizontal, which is the case for instance when agricultural implements are used and are carried by the tractor. The use of semi-carried trailers that is of trailers provided with a single axle shifted rearwardly is a particularly interesting case as it provides numerous advantages as to economy and to increase of the capacity of transportation of the tractor.

The use of hooks or traction bars of the usual type does not allow benefiting by these advan-

2 tages as the supplementary load thus applied to the tractor to the rear of the rear axle is added to the driving reaction so that the tendency to tilting is increased and the driving of the tractor becomes dangerous or impossible chiefly in ascents. The coupling bars of the so called rocking type that are pivotally secured to a vertical axis located underneath the center of the tractor and guided horizontally at the rear do not remove by any means said drawback, as their sole advantage is to allow sharper turns.

The object of my invention is to satisfy simultaneously the different conditions defined hereinabove that are contradictory only in appearance and relate respectively to the dynamic stability of the tractor and to the necessity of turning sharply.

In the coupling according to the invention, the pivoting axes required for the relative movements of the trailer with reference to the tractor are formed in practice by actual axes that are separate from one another, the transversal axes being transferred to the front of the driving wheels of the tractor whereas the vertical axis is on the contrary transferred to the rear of the wheel sufficiently far behind them to allow turns with reduced radii.

Furthermore the vertical axis provides for the rigidity of the whole arrangement against flexional stresses. This arrangement allows the transfer of the vertical stresses such as the weight of a semi-carried trailer for instance on to the transversal axis carried by the tractor.

The transversal axis is practically formed by trunnions symmetrically located on the tractor with reference to its medial plane. The part of the coupling device that is pivotally secured to said trunnions assumes the shape of a fork the arms of which are more or less spaced apart, said fork being located between the rear wheels or else passing round said wheels. In this latter case it is possible to increase the rigidity of this part of the arrangement through a guiding system.

The vertical and longitudinal axes may both be formed in practice by pivots and bearings that are preferably of a comparatively considerable length so as to show the desired rigidity. It is also possible to do away with the longitudinal axis and to form the vertical axis in a following manner: said axis is constituted by two spindle or axis elements that are independent, superposed and in alignment and that rotate inside suitable members rigid respectively with the parts of the coupling device connected with the trailer and with the tractor, one of said members is adapted to move transversally with reference to the trailer or to the tractor while the other is rigidly connected with the coupling device and allows said transversal movement. It is thus possible to provide a certain transversal inclination of one of the vehicles with reference to the other. The freedom of the movement of the member considered is obtained by carrying it through a connecting member that is secured according to the case either to the trailer or to the tractor and that may assume in space any desired angular setting.

A coupling device including a true vertical pivoting axis may according to my invention be made automatically stable if the trailer produces on said device a vertical bearing reaction or thrust. Automatic stability in this case means that the trailer shows a continuous tendency to follow the tractor on the road in alignment therewith. To this end, the axis considered is slightly tilted rearwardly with reference to the direction of progress of the vehicles whereby the pivotal play to either side of the axis of symmetry may have for its result a raising of the trailer so as to produce a torque urging the vehicles back into alignment.

The improved coupling according to the invention allows coupling, one after the other, a series of non-self-balancing single axle trailers.

The following description and corresponding drawings given out by way of example and by no means in a limiting sense will provide a good explanation of the manner of executing my invention, the features appearing either in the drawings or in the specification forming obviously part of said invention. In said drawings:

Fig. 1 is a diagrammatic elevational view of a coupling arrangement according to my invention.

Fig. 2 shows the same arrangement in plan view.

Fig. 3 is a plan view of a modification for securing the arrangement to the tractor.

Fig. 4 is a plan view of a further modification of such securing means.

Fig. 5 is a diagrammatic elevational view of a trailer coupling arrangement including a compressed connecting element.

Fig. 6 is a perspective view illustrating the possibility of rocking round a longitudinal axis in the case of the coupling arrangement shown in Fig. 5.

Figs. 7 and 8 show the details of execution of a spindle located on the vertical axis of the coupling device.

Fig. 9 is a similar to Fig. 5 and shows coupling means including a stretched connecting member.

Fig. 10 is a diagrammatic view of an arrangement furthering the engagement of the coupling means.

Fig. 11 illustrates diagrammatically in elevational view a set of semi-carried trailers.

Fig. 12 is a plan view of a modified form of execution of the coupling of a trailer in a train.

Fig. 13 illustrates a detail of the coupling arrangement of Fig. 9.

Lastly Fig. 14 is an elevational view of the coupling of a semi-carried trailer with a power-driven cultivator.

Returning to Figs. 1 and 2, the transversal axis T the accurate location of which is selected according to the features of the tractor is located to the front of the axis O of the rear wheels C, it is formed in practice by one or two cylindrical rods $T^1$ that are disconnectable or otherwise and may be secured to the central casing or to the frame of the tractor A or else to the casing of the rear axle inside recesses forming part of the tractor. Said recesses may be formed with a tractor element or rigidly secured thereto by means of bolts, collars or the like when they have not been provided by the builder. In this latter case the flexional and torsional stresses transmitted by the auxiliary load to the rear axle may be reduced by spacing as such as possible the two rods forming the axis T and by mounting them on two right hand and left hand members secured to the tractor and connecting rigidly the correspondingly casing elements of the rear axle with the central casing or frame of the tractor A (Fig. 3).

The rods forming the axis T support the totality of the stresses to which the coupling arrangement is submitted: traction, braking, vertical load and transversal stresses arising in the execution of turns. These efforts are transmitted thereto by the fork shaped member B the two right and left arms of which pass above or below the rear axle of the tractor and pivot through their front ends round the axis T.

The arms of the member B may be bent so as to provide the possibility of a sufficient clearance in front of the rear axle of the tractor. They may in fact if required be pivotally secured to one another round an axis V so as to allow an adjustment as to breadth of the points through which the member B is secured to the tractor and in this case their front ends are provided with bores that may be angularly adjustable, for instance through the agency of rotulas so as to allow their correct alignment with the axis T.

If the tractor A (Fig. 4) does not allow the arrangement between its rear wheels C of the fork B, it is possible to locate the latter on the outside of the wheels C so that it may be pivotally secured to the axis T carried by the tractor towards its middle for instance; to give the fork B the necessary lateral rigidity, said fork is provided with a U-shaped part D cooperating with a slideway G secured to the rear of the tractor frame and the shape of which in elevational view is that of an arcuate member having its center on the axis T.

The position as to height of the axis T on the tractor is possibly adjustable through any suitable arrangement, that is not illustrated in the drawings, meeting the varying requirements of traction. The vertical axis V for the pivoting of the coupling means is located as far to the rear in the plane of symmetry of the tractor as may be of interest to allow the sharpest turns to be considered. Said vertical axis serves as a hinge between the rear part of the fork B and the intermediary strap F' forming the end of the trailer beam F.

Lastly the longitudinal axis L serves as a hinge between said strap F' and the beam of the trailer F. It may be associated with a spring damping the tractional stresses and with an automatic control of the trailer brakes. It may also be located to the front of the axis V between the latter and the fork B, according to a modification that is not illustrated.

Each of the three pivoting axes may be executed by means of any type of hinge, the figures being solely diagrammatical and given out in order to disclose the principle of the invention.

The connection and disconnection between the trailer and the tractor may be obtained by any means such as dismountable axes and the like. The disconnection may be obtained through any of the pivoting axes, for instance the transversal axis T so as to easily release for other purposes the usual draw-bar or hook of the tractor. In this case the whole arrangement of parts forming the coupling means is rigidly with the trailer beam; only the recesses holding the rods constituting the axis T are rigid with the tractor.

The connection with the beam F may be executed through said fork in a manner illustrated in Figs. 5 and 9. In said figures, the axis V is formed practically by two spindles or axes MN arranged respectively above one another. The vertical axis V thus defined may be rigidly connected with the fork B which case is not illustrated or else, as shown in said Figs. 5 and 9, with the beam F of the trailer. The longitudinal pivoting movement of the tractor with reference to the trailer and reversely without using any pivoting axis such as that provided in Fig. 1 between the parts F and F' is allowed in the following manner: one of the spindles M or N is connected with the fork or with the beam, as the case may be, through the agency of a pivoting bar with a universal joint at both ends. The other spindle is given a sufficient play for allowing the first spindle to rotate with a sufficient amplitude round a longitudinal axis. Thus in Fig. 5, the spindle M passing through the strap F1 rigid with the beam F is connected with the fork B through a bar P carrying Cardan joints at both ends, said bar P being consequently pivotally secured to the fork B on one hand and to a bearing for the spindle M on the other hand. On the other part the lower spindle N passes through a stationary strap F2 of the beam and as shown in Fig. 7 it is provided in its central part with a rotula R passing through the eye forming the end of the fork B. Fig. 8 shows that this rotula allows the beam F to assume a certain slope with reference to the fork B, the bar P following said displacements through its Cardon pivoting means. As apparent from inspection of Fig. 6, a certain rocking movement of an amplitude $2a$ of the trailer with reference to the tractor is allowed to either side of a mean position round a longitudinal axis.

In the case of a trailer exerting a thrust action on its coupling, for instance in the case of a semi-carried trailer, the load of this trailer is partly transferred to the tractor. This load produces a compression of the upper portion of the coupling and a traction on its lower portion. For this reason, in the example illustrated in Fig. 5, the bar P is designed so as to operate under compressional stresses. On the contrary, in the example of Fig. 9 the upper spindle M defines the position of the longitudinal rocking axis. In this case, the member connecting the fork B with the lower part F2 of the beam operates under tractional stresses and as in the case of the preceding example, said connection should allow the free displacement of the beam with reference to the fork round the longitudinal axis. The connection may be obtained through a stretched rod of any description suitably pivoted at its end or else as shown in Fig. 9 by a chain P'. To make the coupling easier, the elements P are preferably of adjustable length and they may for instance be of a telescopic structure. For the same reason the elements P' are preferably bendable or made of articulated sections. As the stresses to which the elements or rods are submitted are of constant direction, they are always set at their shortest length for the compressed elements or else at their maximum length in the case of stretched elements. Thus, in the case of the bar P, it is sufficient to provide a stop for the end of its stroke while the elements P' may be a cable, a chain or a rod pivotally secured in any manner whatever and permanently stretched during operation.

The members carrying the two spindles MN may be mounted on telescopic elements both secured either to the tractor or to the trailer so as to remove the necessity of an accurate length in the coupling operation.

The trailer, when uncoupled, rests on its two wheels and on a prop at the front and it is consequently possible to insert the pegs or spindles MN, after the fork B has been coupled first with the tractor, without the distance between the tractor and the trailer being accurately defined for said operation. When the prop is removed through any suitable means and the weight of the front of the trailer bears on the tractor, the draw-bar and thrust-bar bear on their corresponding stops and keep on same automatically.

The coupling operation will be still further made easy if the positioning of the tractor with reference to the trailer does not require any accuracy either in the transversal direction.

To this purpose it is possible to provide the securing means that do not include a bar or a chain (N in the case of Fig. 5 and M in the case of Fig. 9) with any known automatic guiding or coupling means, the positioning of the other securing member being made easy through the modification in length and the possibility of angularly adjusting said bar or chain.

An arrangement of this type is illustrated in Fig. 10 and corresponds to the case of the spindle N of Fig. 5. This spindle passes through the strap F1 rigid with the beam F and through an opening provided in a flat plate K adapted to rock freely round a longitudinal axis on said spindle. On the other hand, the fork B ends towards its rear part under the form of a casing D inside which said flat plate K is automatically centered through its tapering end K1 when the tractor is caused to recede towards the trailer, whereby the two vehicles are constrained to come into alignment. It is then easy to provide for the coupling by inserting a pin in the openings H and H1 of the casing D and of the plate K, which openings are then in register.

Two steering stops J1—J2 rigid with the beam F are adapted to come into contact with the stops Q1 and Q2 carried by the fork so as to prevent the angle formed in turns between the two vehicles from becoming smaller than a predetermined value.

Stability of the coupling, i. e. its tendency to return automatically into the alined position of the vehicles may be obtained by modifying the vertical position of the axis V; it is sufficient to this purpose to incline the axis and to give it for instance the position illustrated at V1 in Fig. 5 either by shifting forwardly the lower spindle N or by shifting rearwardly the upper spindle M. By reason of the slope thus assumed by the hinging axis, any angular shifting between the trailer and the tractor urges the coupling upwards. As the vertical load applied thereto has a tendency to urge it downwardly, this results in a torque returning into alignment the two vehicles, i. e. into a position that corresponds to the lowermost position of the coupling, or position of stable equilibrium.

The application of the coupling means that have been disclosed to the traction of a train of semi-carried trailers is illustrated in Fig. 11.

One or more semi-carried trailers may then be inserted in the manner illustrated in said figure in a train of vehicles of any description or incorporated to the end of such a train.

The transversal axis T2 of each of the coupling arrangements coincides with the axle E1 of the preceding trailer Z1 . . . or at least it is located in the vicinity of said axle. The vertical load of the coupling means is thus applied entirely to the axle of the preceding vehicle and transmitted directly to ground through the wheels of the latter axle. No thrust due to the bearing of the trailer is thus capable of modifying the longitudinal equilibrium of the preceding vehicle. On the other hand, the vertical load of the couplings bears always in the same direction on their pivoting elements whereby, whatever play said pivoting members may show, the shocks produced through the moving on the road do not produce any jerks or incoordinated movements in the coupling arrangements.

The transversal axes T1, T2 . . . of the successive couplings and the spindles N, N2 . . . at the lower end of the vertical axes V1, V2 . . . of said couplings are all located at the same level above ground; in other words, for a same trailer such as Z1, the straight line joining the points N1 and N2 passes through the transversal axis T2.

Under such conditions when a wheel of the trailer Z1 passes in a hole or over a hindrance of the size generally encountered on a road, it may be practically admitted that the trailer system pivots round the longitudinal axis N1—N2 and consequently the displacement has no substantial action on the position of the other vehicles of the train. This displacement therefore does not produce a substantial nosing movement that might be transmitted with amplification to the following vehicles one after the other and would therefore constitute a serious danger at ordinary road speeds.

The train of vehicles thus executed is therefore stable on its path both vertically and horizontally which is not the case in general for two-wheeled trailers provided with other coupling systems.

The location of the vertical pivoting axes V2 . . . with reference to the axles of two trailers following one another is selected in the vicinity of one half of the distance between said axles. This solves practically the problem of correct turning and the wheels of all the vehicles pass in succession substantially through the same tracks in turns.

To make the coupling and uncoupling operations easier, it is possible to completely separate the forks B from the telescopic thrust bars P by pivotally securing the front end of the latter no longer on the forks B but directly on the transversal axes T. Thus as shown in Fig. 12, the thrust bar P ends at Y on the axle E of the trailer Z at a point substantially in the middle of said axle. All the pivoting points including those of the fork B and that of the bar P are alined with the axis T. Seen in elevation, the thrust bar occupies thus the position P'2 shown in dotted lines in Fig. 11.

The connection between the bar P and the two arms of the fork B in the case of Fig. 12 may be executed in the manner illustrated in Fig. 13 so as to allow an easy and rapid engagement and locking without it being necessary for the driver to pass underneath the vehicles.

Each bar ends with a bent portion U engaging a hook or ring E' carried by the axle E while a bolt U' that may be operated from a distance by a rod U'' provides for the reliability of the coupling.

The coupling means that have been described are also applicable to power-driven cultivators or two-wheeled tractors. In this case, the transversal coupling axis T is formed by the very axis of the tractor wheels and the fork B is constituted by a rigid member secured to the frame of the tractor through any suitable means. The remainder of the coupling system is identical with that described precedingly. It is possible to provide on the beam F a seat S for the driver who may drive the vehicle in the usual manner through the steering bar G1.

Obviously many modifications may be brought to the above described arrangements without widening unduly thereby the scope of my invention as defined in accompanying claims.

What I claim is:

1. A coupling device between a first and a second vehicle the former trailing the latter, comprising a yoke member pivotally connected to the first vehicle through a horizontal transverse axle, a tongue member rigidly carried by the second vehicle, a first universal joint connecting said tongue member to said yoke member, an intermediate member connected to one of the former members through a second universal joint and to the other through a third universal joint substantially vertically disposed with respect to the first universal joint.

2. An arrangement for coupling a non-self-balancing vehicle to another tractive vehicle comprising a yoke member pivotally connected at the rear of the tractive vehicle about a horizontal transverse axle, a tongue member rigidly carried by the second vehicle, a first universal joint connecting said tongue member to said yoke member, an intermediate compressed member connected by one end to said yoke member, in front of said first universal joint, through a second universal joint and by the other end to said tongue member through a third universal joint substantially vertically disposed above the first universal joint.

3. An arrangement for coupling a non-self-balancing vehicle to another tractive vehicle comprising a yoke member pivotally collected at the rear of the tractive vehicle about a horizontal transverse axle, a tongue member rigidly carried by the second vehicle, a first universal joint connecting said tongue member to said yoke member, an intermediate compressed telescopic member comprising a stop for limiting its length in compressed state, a second universal joint for connecting one end of said telescopic member to said yoke member in front of said first universal joint, and a third universal joint for connecting the other end of said compressed member to said tongue member above the first universal joint and substantially on the vertical thereof.

4. A coupling arrangement according to claim 2 in which the third universal joint is arranged slightly at the rear of the vertical through the first universal joint.

5. An arrangement for coupling a non-self-balancing vehicle to another tractive vehicle comprising a yoke member pivotally connected at the rear of the tractive vehicle about a horizontal transverse axle, a tongue member rigidly carried by the second vehicle, a first universal joint connecting said tongue member to said yoke member, an intermediate unstretchable member, a second universal joint for connecting one end of said unstretchable member to said yoke member in front of said first universal joint, and a third universal joint for connecting the other end of said unstretchable member to said tongue member below the first universal joint and substantially on the vertical thereof.

MAURICE VALIN.

REFERENCES CITED

The following references are of record in the file of this patent:

UNITED STATES PATENTS

| Number | Name | Date |
|---|---|---|
| 2,160,350 | Beckman | May 30, 1939 |
| 2,163,999 | Jacks | June 27, 1939 |
| 2,223,375 | Le Tourneau | Dec. 3, 1940 |
| 2,347,898 | Ferguson | May 2, 1944 |
| 2,404,925 | Sauer | July 30, 1946 |